June 5, 1928.
M. T. TIPSORD ET AL
PROTECTING APPARATUS FOR LINEMEN
Filed Jan. 30, 1926
1,672,476
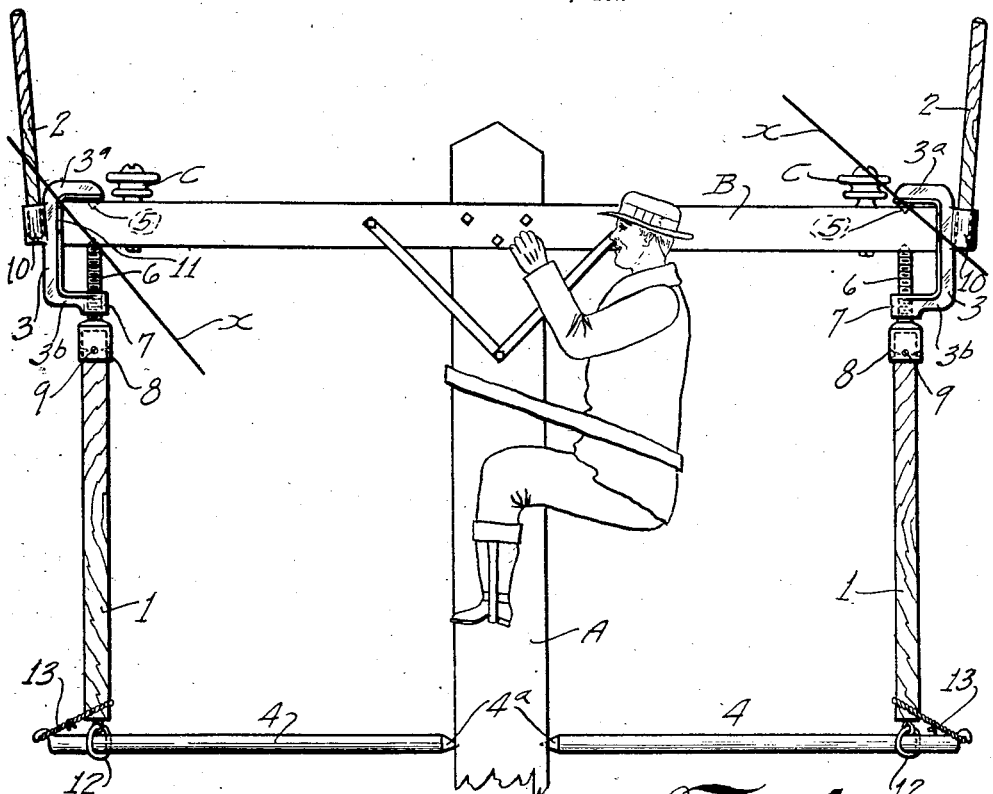
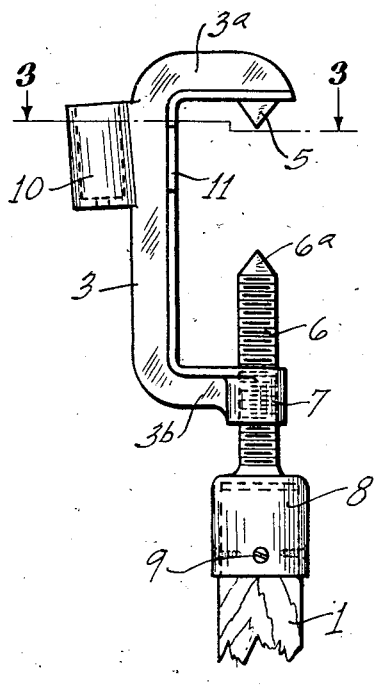
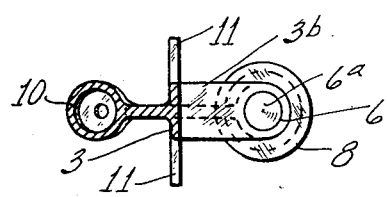
INVENTORS
Henry W. Bodendieck.
Melvin T. Tipsord.
ATTORNEYS Patented June 5, 1928.

1,672,476

UNITED STATES PATENT OFFICE.

MELVIN T. TIPSORD AND HENRY W. BODENDIECK, OF TAYLORVILLE, ILLINOIS, ASSIGNORS TO TIP'S TOOL COMPANY, INCORPORATED, OF TAYLORVILLE, ILLINOIS, A CORPORATION OF ILLINOIS.

PROTECTING APPARATUS FOR LINEMEN.

Application filed January 30, 1926. Serial No. 85,045.

This invention relates to devices of the kind that are used to protect linemen while they are working on poles which carry wires through which electric current flows.

The main object of our invention is to provide an apparatus, which, when arranged in operative position on a pole equipped with a cross arm, will virtually form an insulated shield for a lineman working on the pole and eliminate the possibility of a loose wire swaying inwardly and contacting with the lineman's body.

Another object is to provide a protecting apparatus for linemen that can be installed quickly and easily and which can be used with pole cross arms and poles of various kinds and dimensions.

To this end we have devised a protecting apparatus for linemen, which, in its simplest form, consists of a means adapted to be mounted on a pole cross arm adjacent the outer end of same and having provision for preventing a loose wire from swaying inwardly and striking against the body of a lineman who is working on the pole below the cross arm. The apparatus preferably consists of members which are adapted to be combined with a pole and a cross arm on the pole in such a way as to form an insulated frame that surrounds a lineman who is working on the pole at a point below the cross arm, and upwardly-projecting wire arresting members at the ends of the cross arm which prevent loose wires from swaying inwardly above the cross arm.

In the preferred form of our invention, as herein illustrated, the complete apparatus consists of two devices constructed so that they can be easily arranged in operative position on a pole cross arm adjacent the outer ends of same, wire arresting members projecting downwardly from said devices and constructed of wood or other suitable non-conducting material, members disposed at substantially right angles to said wire arresting members and arranged with their inner ends in engagement with the pole that carries the cross arm, thereby forming two rectangular-shaped frames that project laterally in opposite directions from the pole and which are of sufficient dimensions to receive a lineman who is working on the pole below the cross arm, and wire arresting members constructed of wood or other suitable insulating material projecting upwardly from said devices so as to hold loose electric wires in a safe position after they have been disconnected from the insulators on the cross arm. It is immaterial, however, so far as our broad idea is concerned, whether the apparatus is constructed so as to form two substantially rectangular-shaped frames arranged at opposite sides of the pole, or only a single frame arranged at one side of the pole. The particular construction of the device or devices on the cross arm that carry the various wire arresting members of the apparatus is also immaterial, so long as said devices are of such design that they can be applied and removed quickly and easily.

Figure 1 of the drawings is a perspective view of a protecting apparatus for linemen constructed in accordance with our invention.

Figure 2 is an enlarged side elevational view of one of the supporting devices for the wire arresting members; and Figure 3 is a cross-sectional view of said device, taken on the line 3—3 of Figure 2, looking in the direction indicated by the arrows.

In the preferred form of our invention herein illustrated A designates a pole such as is used for carrying electric wires, B designates a cross arm on said pole, and C designates insulators on said cross arm to which electric wires $x$ are normally lashed. When it becomes necessary to replace the insulators on the cross arm it is the usual custom to disconnect the wires from the insulators and then arrange props or struts between the wires and the pole so as to hold the wires spaced away from the insulators. This practice is exceedingly dangerous, particularly when the wires are used for carrying high tension currents, and many serious accidents have resulted from the props becoming disarranged or the wires slipping off the props and swaying inwardly into contact with the body of the lineman working on the pole below the cross arm. Accordingly, we propose to equip a pole cross arm with wire arresting members arranged far enough away from the lineman on the pole to not interfere with the work he is performing, but which are so disposed that they absolutely eliminate the possibility of the wires coming in contact with the lineman's body. Our complete apparatus preferably consists of two wire arresting members 1 constructed of wood or other suitable non-conducting material that project downwardly from the end portions of the cross arm B parallel or substantially parallel to the pole A, two wire arresting members 2 constructed of wood or other suitable non-conducting material that project upwardly from the ends of the cross arm, and supporting devices 3 for said wire arresting members detachably connected to the end portions of the cross arms B. In most instances struts 4 will be arranged between the pole A and the lower ends of the wire arresting members 1 at substantially right angles to said members 1 so as to take up any side strains to which the members 1 are subjected from swaying wires and also to co-operate with said members 1, with the pole A and with the cross arm B to form a frame or protecting shield that surrounds the linemen. The supporting devices 3 can be constructed in various ways without departing from the spirit of our invention, and various means can be used for connecting the outer ends of the struts 4 to the downwardly-projecting wire arresting members 1. In the form of our invention herein illustrated each of the supporting devices 3 is substantially C shaped in outline and is adapted to be slipped over one end of the cross arm B with its top leg $3^a$ disposed parallel to the cross arm and projecting inwardly over the top side of same and with its bottom leg $3^b$ projecting inwardly below the cross arm. The top leg $3^a$ is provided with a spur or sharp projection 5 that is adapted to bite into the cross arm, and an adjustable clamping element 6 is mounted in the bottom leg $3^b$ so as to engage the underside of the cross arm, said clamping element 6 being screwed into an internally-screw-threaded sleeve 7 on the bottom leg $3^b$ of the supporting device, and provided at its upper end with a spur or sharp pointed projection $6^a$. On the lower end of the clamping element 6 is a socket 8 that receives the wire arresting member 1, and said member is permanently connected to said socket by screws or other suitable fastening devices 9 so that said member 1 can be used for rotating the clamping element 6 to clamp the supporting device 3 in operative position on the cross arm or release said device from the cross arm. The wire arresting member 2 can be combined with the device 3 in any suitable way, but we prefer to provide said device with a socket 10 in which the lower end portion of the member 2 is positioned. Preferably, the vertically-disposed portion of the supporting device 3 is provided with laterally-projecting wings 11 that bear against the end of the cross arm, and thus prevent the device from twisting or turning into such a position as to throw the top and bottom legs of same out of parallel relationship with the cross arm. In the apparatus herein illustrated the strut 4 is provided at its inner end with a sharp pointed projection or spur $4^a$ that is adapted to bite into the pole A, and the wire arresting member 1 is provided at its lower end with an eye or ring 12 in which the outer end portion of the strut 4 is positioned, said strut and member 1 being detachably connected together by a lashing 13 or other suitable means, which will hold said parts at substantially right angles to each other and cause the strut 4 to take up any side strains or thrusts to which the wire arresting member 1 is subjected.

In using our apparatus the supporting devices 3 are adapted to be slipped over the ends of the cross arm B and clamped securely to said cross arm by rotating the wire arresting members 1 in a direction to cause the spurs 5 on the devices 3 to bite into the top faces of the cross arm and the spurs $6^a$ on the clamping elements 6 to bite into the underside of the cross arm. The struts 4 are then arranged in engagement with the pole A and lashed or connected in any other suitable way to the lower ends of the wire arresting members 1, and after the wires $x$ have been disconnected from the insulators C and moved laterally beyond the ends of the devices 3, the wire arresting members 2 are positioned in the sockets 10 of said devices 3 so as to prevent said wires from moving inwardly over the top side of the cross arm.

An apparatus of the construction above described is inexpensive to construct; it can be installed or removed quickly and easily; it can be used with poles and pole cross arms of various kinds and dimensions, and when arranged in operative position, it absolutely eliminates the possibility of the wires which have been disconnected from the cross arm insulators from swaying inwardly either above the cross arm or below the cross arm, and thus striking against the body of the lineman working on the pole.

Having thus described our invention, what we claim as new and desire to secure by Letters Patent is:

1. A protecting apparatus for linemen, comprising a device that is adapted to be detachably connected to a pole cross arm adjacent the outer end of same, a non-conducting member projecting downwardly from said device, and a member projecting laterally from the pole below the cross arm and connected to the lower end portion of said non-conducting member, for the purpose described.

2. A protecting apparatus for linemen, comprising a device adapted to be connected to a pole cross arm adjacent the outer end of same, non-conducting members projecting upwardly and downwardly from said device, and a thrust member projecting laterally from the pole and detachably connected to the lower end portion of said downwardly-projecting member.

3. A protecting apparatus for linemen, comprising a substantially C-shaped device that is adapted to be slipped over the end of a pole cross arm, a clamping element adjustably mounted in the bottom leg of said device, and wire arresting members projecting upwardly and downwardly from said device, for the purpose described.

4. A protecting apparatus for linemen, comprising a substantially C-shaped device adapted to be mounted on a pole cross arm and provided with means that bears against the end of the cross arm and holds said device properly positioned with relation to the cross arm, means for clamping said device to the cross arm, and wire arresting members projecting upwardly and downwardly from said device.

5. A protecting apparatus for linemen, comprising a substantially C-shaped device adapted to be slipped over the end of a pole cross arm, a clamping element adjustably mounted in the bottom leg of said device, a wire arresting member projecting downwardly from said clamping element, and a socket on said device for receiving an upwardly-projecting wire arresting member.

6. A protecting apparatus for linemen, comprising a device adapted to be detachably connected to a pole cross arm adjacent the outer end of same, a wire arresting member projecting downwardly from said device and provided at its lower end with an eye, and a second member positioned in said eye at substantially right angles to said wire arresting member and arranged with its inner end bearing against the pole that carries the cross arm.

7. A protecting apparatus for linemen, comprising a substantially C-shaped device adapted to be slipped over a pole cross arm, a socket on said device that is adapted to receive an upwardly-projecting wire arresting member, a clamping element adjustably mounted in the bottom leg of said device for clamping said device to the cross arm, a downwardly-projecting wire arresting member connected to said clamping element and provided at its lower end with an eye or ring, and a member arranged in said ring at substantially right angles to said downwardly-projecting member and arranged with its inner end engaging the pole that carries the cross arm.

8. A protecting apparatus for linemen adapted to be arranged in a substantially vertical position at one side of a pole below a rigid cross arm on the pole, means for detachably connecting said member to the arm, and a second member adapted to be arranged in a substantially horizontal position below the cross arm and engaged with the pole and with the member first referred to so as to form a frame inside of which a lineman can work with safety at a point below the cross arm.

9. A protecting apparatus for linemen, comprising members adapted to be detachably connected with a pole and with a rigid cross arm on the pole so as to form a frame below the cross arm in which a lineman can work with safety, and elements at the outer sides of said frame that project upwardly above the cross arm and thus prevent loose wires from swaying inwardly above the cross arm.

MELVIN T. TIPSORD.
HENRY W. BODENDIECK.